May 2, 1950
E. R. PRICE
2,506,105
TRANSMISSION OPERATING MECHANISM
Original Filed Dec. 31, 1941
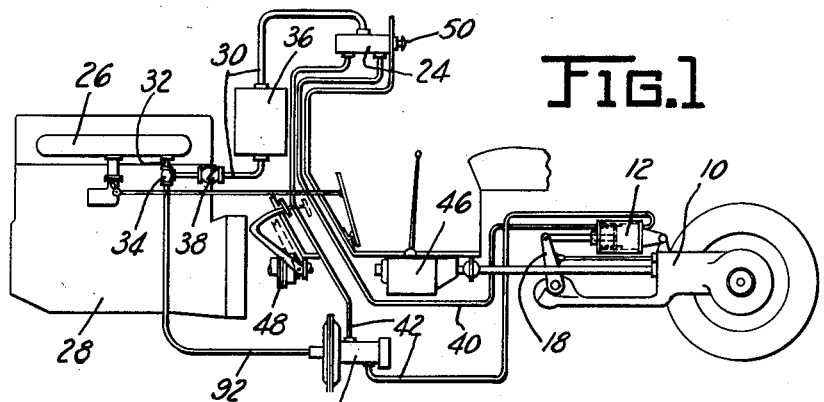
INVENTOR
EARL R. PRICE
BY H. O. Clayton
ATTORNEY Patented May 2, 1950

2,506,105

UNITED STATES PATENT OFFICE 2,506,105

TRANSMISSION OPERATING MECHANISM

Earl R. Price, South Bend, Ind., assignor to Bendix Aviation Corporation, South Bend, Ind., a corporation of Delaware Original application December 31, 1941, Serial No. 425,113, now Patent No. 2,373,259, dated April 10, 1945. Divided and this application December 1, 1944, Serial No. 566,121

2 Claims. (Cl. 74—472)

This invention relates in general to means for operating an automotive change-speed transmission and in particular to power means operable to effect a silent and smooth meshing of the gears in all operations of the transmission and irrespective of the speed of the vehicle.

The most important object of my invention is to provide power means for so operating an automotive overdrive or a two-speed rear axle mechanism as to insure a synchronization of the driving and driven gears of said mechanism before said means is operative to shift the transmission from its high to its low gear ratio setting.

Yet another object of the invention is to provide a double-acting transmission operating pressure differential and spring operated motor operable, in cooperating with an operation of the accelerator of the vehicle, to actuate a transmission mechanism of an automotive vehicle, said motor being so controlled by valvular means as to effect a shift from an overdrive setting of the transmission to an underdrive setting thereof when and only when the speed of the engine is such as to insure a quiet meshing of the gears.

A further object of the invention is to provide, in an automotive vehicle including an accelerator and an internal combustion engine having an intake manifold, a transmission operating mechanism including a manifold vacuum and spring operated valve operable when the engine driven driving element of a change gear transmission is rotating at the same speed as the vehicle driven element of said transmission, to make possible an operation of said mechanism to establish the transmission in a relatively low gear ratio setting when and only when the manifold vacuum is decreased by opening the throttle to increase the speed of the engine and thereby operate said valve the opening of the throttle also serving to increase the speed of the engine driven element of the transmission.

A further object of the invention is to provide, in an automotive vehicle including an internal combustion engine having an intake manifold, an accelerator and a two-speed axle which may include a synchronizing mechanism, power means for operating the change-speed mechanism of said axle, the operation of said power means being controlled by a manually operated selector valve and by the operation of a valve controlled by the vacuum within the intake manifold of the internal combustion engine, the latter being in part controlled by the accelerator.

My invention also contemplates the provision of the aforementioned power means for operating the two-speed rear axle of an automotive vehicle, said vehicle being equipped with a manually or power operated change-speed transmission and clutch means incorporated in the force transmitting means connecting the engine with the change-speed transmission, said clutch means including either a friction clutch or a fluid clutch or both of said clutches.

Other objects of the invention and desirable details of construction of parts will become apparent from the following detailed description of certain embodiments of the invention, taken in conjunction with the accompanying drawings illustrating said embodiments, in which:

Figure 1 is a diagrammatic view disclosing the principal elements of an embodiment of my invention the control means including a manifold vacuum and spring operated synchronizer valve;

Figure 2 is a sectional view disclosing the details of the manually operated four-way selector valve used with the transmission operating mechanism disclosed in Figure 1;

Figure 3 is a sectional view disclosing in detail the transmission operating pressure differential and spring operated motor of the transmission operating mechanism of Figure 1; and Figure 4 is a sectional view disclosing in detail the pressure differential and spring operated synchronizer valve of the transmission operating mechanism disclosed in Figure 1.

Referring now to Figure 1 disclosing a preferred embodiment of my invention, a two-speed axle 10 of conventional design is operated by a double-acting, double-ended spring and vacuum operated motor unit 12 disclosed in detail in Figure 3. This motor unit comprises a casing 14 housing a power element 16 operably connected to a transmission operating crank 18 by means of a connecting rod 20. A spring 22, interposed between the power element 16 and one end wall of the casing 14, serves to move the transmission from its high gear setting to its neutral setting as a part of the operation of placing the transmission in low gear, all as described in greater detail hereinafter.

The operation of the unit 12 is controlled by a four-way selector valve 24, disclosed in detail in Figure 2, connected to the intake manifold 26 of the internal combustion engine 28 of the car by conduits 30 and 32 which are interconnected by a fitting 34. A vacuum tank 36 and a check valve 38 are incorporated in the conduit 30 for a purpose to be described hereinafter. The selector valve 24 and the motor 12 are interconnected by a conduit 40 and a conduit 42, the latter having incorporated therein a spring and pressure differential operated control valve unit 44 serving as a vacuum cut-in valve to connect said motor with the vacuum tank 36 when the gaseous pressure of the intake manifold is increased by a speeding up of the engine. Other elements of the automotive power plant disclosed in Figure 1 include a standard selective gear transmission 46 and a manually operated friction clutch 48; and these mechanisms cooperate with the two-speed axle operating power means constituting the invention disclosed in said figure.

Describing now the operation of the mechanism disclosed in Figures 1 to 4, inclusive, and incidentally completing the description of the parts thereof not heretofore referred to, it will be assumed that the vehicle is at a standstill with the engine idling and the two-speed axle in its low gear position. The driver will then, after disengaging the friction clutch 48, probably place the transmission 46 in one of its relatively low gear settings and will then start the vehicle in motion by engaging the friction clutch as the accelerator is depressed to open the throttle.

After the vehicle is under way the driver will then probably wish to establish the two-speed axle in its high gear setting and this is effected by pulling a selector valve operating knob 50 outwardly and releasing the accelerator. The latter operation, as previously described, reverses the torque of the internal combustion engine 28 thereby making it possible for the then energized motor unit 12 to demesh the gears establishing the two-speed axle in its low gear setting, that is, neutralize the axle. Describing this operation of the motor unit, when the knob 50 is pulled outwardly, a valve member 52, Figure 4, connected to the knob by a rod 54, is moved to a position to place a compartment 56 of said unit in air transmitting connection with the intake manifold 26 via the conduits 32 and 30, the vacuum tank 36, a recess 58 in the valve member 52 and the conduit 40. A spool-shaped cut-off valve member 72 of the vacuum cut-in valve unit 44 is at this time, that is when the accelerator is released, moved to a position to the left of the position disclosed in Figure 4, thereby making possible an air transmitting connection between the conduit 42 and vent ports 70 in said valve unit. The construction and operation of the unit 44 is described in greater detail hereinafter.

The power element 16 of the motor unit is then subject to a differential of pressures resulting in its moving to the left, Figure 3, to first neutralize the transmission of the two-speed axle and then establish said axle in its high gear setting which operation is completed after the gears to be meshed are synchronized. It will also be noted that in moving to the left the power element 16 serves to compress or cock the transmission neutralizing spring 22.

When the driver wishes to shift the two-speed axle to its low gear setting, e. g. when the vehicle is climbing a hill, the knob 50 is pushed into the position disclosed in Figure 2, whereupon the compartments 60 and 56 of the motor unit are connected respectively to the valve unit 44, Figure 4, and the atmosphere. Now, when the accelerator is released to reverse the torque of the engine the spring 22, constituting a part of the motor unit, expands to the position disclosed in Figure 3, thereby neutralizing the transmission mechanism of the two-speed axle.

Describing now the most important feature of my invention, it will be noted, from an examination of the mechanism disclosed in Figure 4, that there is provided the aforementioned spool-shaped cut-off valve member 72 slidable within a ported valve casing member 74 said casing member and valve member together constituting a three-way valve. To one end of the latter member there is secured a dish-shaped member 76 which is secured at its periphery 78 to the periphery 80 of a dish-shaped member 82. The members 76 and 82 together constitute a housing for a flexible diaphragm 84 secured at its periphery to the peripheral portions 78 and 80 of said members and secured at its central portion to one end of a rod 86 extending from one end of the cut-off valve member 72. A spring 88 is interposed between the diaphragm 84 and one end of a hollow member 90 extending from and integrally secured to the member 82. A conduit 92, interconnecting the aforementioned fitting 34 and one end of the hollow member 90, serves to place a compartment 94 of the valve unit 44 in air transmitting communication with the intake manifold.

Describing the operation of the spring and pressure differential operated vacuum cut-in valve unit 44, when the accelerator is quickly depressed the gaseous pressure within the intake manifold is, as is well known in this art, substantially increased; accordingly, the gaseous pressure within the compartment 94 is correspondingly increased. The spring 88 then expands to move the diaphragm 84 to the position disclosed in Figure 4 and air to the right of the diaphragm is forced out of the valve unit through an opening 96. The cut-off valve member 72 is by this operation moved to the aforementioned position whereby the two sections of the conduit 42 are placed in air transmitting connection with one another. It is to be remembered that this is the position of the valve member 72 when the knob 50 is pushed inwardly to its low gear position before the accelerator is released; however, it is also to be remembered that despite the fact that the power element of the motor unit 18 is then subjected to a differential of pressures and to the loading of the spring 22, said power element will not move to the right to neutralize the two-speed axle transmission until the accelerator is released to reverse the engine torque.

Continuing the description of the cycle of operations to establish the two-speed axle transmission in low gear, the selector valve 24 having been placed in its low gear position and the accelerator released to effect a neutralization of the axle mechanism, the accelerator is then depressed to increase the speed of the engine to effect a speeding up of the driving gear of the two-speed axle mechanism and a resultant synchronization of the gears of the transmission to be meshed and also effect an expansion of the spring 88 to move the valve member 72 to the position disclosed in Figure 4; for when the accelerator is depressed the resultant increase of the gaseous pressure in the intake manifold effects a corresponding increase of the gaseous pressure in the compartment 94 of the valve unit 44. The diaphragm 84 is then moved to the right by the expansion of the spring 88 for a compartment 98 of the unit 44 is at the time vented to the atmosphere via the opening 96 in the valve casing 74. It is apparent, therefore, that when the accelerator is depressed the diaphragm 84 and the cut-off valve member 72 connected thereto are moved to the right, Figure 4, to interconnect the sections of the conduit 42 and thereby connect the compartment 60 of the motor unit 12 with the vacuum tank 36.

It follows, therefore, that after the accelerator is released to effect a neutralization of the two-speed axle the motor unit 12 is not again energized to make possible a low gear operation of the two-speed axle until the accelerator is again depressed sufficiently to effect an operation of the cut-off valve 72 by the spring 88, and it now becomes apparent why the vacuum tank 36 is incorporated in the conduit 30, for despite the presence of the check valve 38 there might, due to the insufficient length of the conduits 30 and 42 or their interior diameters be an inadequate source of vacuum to effect an operation of the motor unit 12.

Completing the description of the operation of the mechanism disclosed in Figure 3 when the gears of the axle mechanism have been synchronized the pressure differential operated element 16 completes the movement of the crank 18 to establish the two-speed axle in its low gear setting.

There is thus provided, in the mechanism disclosed in Figures 1–4, inclusive, means for effecting a speedy and quiet operation of the transmission mechanism of a standard two-speed axle which axle may or may not include a synchronizer mechanism; for with the mechanism disclosed in these figures, the selector valve 24 may be operated either before or after the accelerator is released and all that the driver need do, to place the two-speed axle in low gear, is to release and then depress the accelerator. To place the two-speed axle in high gear the driver merely operates the valve 24 and releases the accelerator.

This application constitutes a division of my U. S. Patent No. 2,373,259, dated April 10, 1945.

The characteristics and invention are further sufficiently referred to in connection with the following detailed description of the accompanying drawings, which represent preferred embodiments of the invention and certain modifications thereof. After considering these examples, skilled persons will understand that many variations may be made without departing from the principles disclosed; and I contemplate the employment of any structures, arrangements, or modes of operation that are properly within the scope of the appended claims.

I claim:

1. In an automotive vehicle provided with an intake manifold, an accelerator and a two-speed axle transmission, power means for operating said transmission comprising a double-acting motor, a four-way selector valve, cooperating with the accelerator in its operation of controlling the engine torque, for in part controlling the operation of said motor, air transmitting means interconnecting the manifold and four-way valve, a conduit interconnecting one end of the motor with said valve, a vacuum cut-in valve cooperating with the four-way valve and accelerator for controlling the operation of the motor, an air transmitting conduit interconnecting said vacuum cut-in valve with the four-way valve and an air transmitting conduit interconnecting the vacuum cut-in valve with the other end of the motor, the aforementioned parts of said power means being so constructed and arranged and so operative that with a certain setting of the four-way valve the vacuum cut-in valve serves, when established in a certain setting, to make possible a vacuum operation of the motor to establish the transmission in its low gear setting.

2. In an automotive vehicle provided with an internal combustion engine, an accelerator for in part controlling the operation of said engine, a two-speed rear axle mechanism and a crank for operating said axle mechanism, power means for moving said crank comprising a double-acting vacuum and spring operated motor having its power element connected to said crank, a spring within said motor said spring being compressed by the power element of the motor and operable, when the motor is energized to effect one of the settings of the transmission, to rotate the crank in a direction to demesh the gears of the two-speed rear axle establishing the same in the higher of its two gear ratio settings, means for controlling the operation of said motor and spring including a manually operated four-way selector valve mounted within easy reach of the driver of the vehicle, air transmitting means interconnecting said valve with the intake manifold of the internal combustion engine, a plurality of air transmitting conduits interconnecting said valve with the motor, a power operated control valve, indirectly controlled by an operation of the accelerator, incorporated in one of the latter conduits, the parts of the aforementioned mechanism being so constructed and arranged and so operative as to effect the high gear setting of the two-speed axle when the selector valve is operated to connect a part of the aforementioned air transmitting means with the internal combustion engine and the accelerator is released to idle the engine and thereby create sufficient vacuum in the intake manifold to effect an energization of the motor said release of the accelerator serving to reverse the torque of the engine to make possible the demeshing of the low speed gears of the transmission and a meshing of the high speed gears after the gears of the two-speed axle are synchronized, the mechanism being also operative to effect a low gear setting of the two-speed axle when the accelerator is released to reverse the torque of the engine and the selector valve is again operated to make possible an energization of the motor the spring then serving to partially expand to demesh the gears establishing the axle mechanism in its high gear setting, said spring completing its expansion, aided by the energized motor, to establish the axle mechanism in its low gear setting when the accelerator is depressed to speed up the engine and thereby effect a synchronization of the gears to be meshed, said depression of the accelerator also serving to effect an operation of the control valve to thereby effect the last mentioned energization of the motor.

EARL R. PRICE.

REFERENCES CITED

The following references are of record in the file of this patent:

UNITED STATES PATENTS

| Number | Name | Date |
| --- | --- | --- |
| 1,251,246 | Landis | Dec. 25, 1917 |
| 2,079,654 | Linsley | May 11, 1937 |
| 2,094,449 | Forichon | Sept. 28, 1937 |
| 2,175,152 | Hey | Oct. 3, 1939 |
| 2,234,463 | Brewer | Mar. 11, 1941 |
| 2,250,835 | Kliesrath et al. | July 29, 1941 |
| 2,281,159 | Kliesrath et al. | Apr. 28, 1942 |
| 2,332,341 | Price et al. | Oct. 19, 1943 |